United States Patent
Amouroux et al.

(10) Patent No.: US 7,858,165 B2
(45) Date of Patent: Dec. 28, 2010

(54) POLYAMIDE-BASED MULTILAYER TUBE FOR TRANSFERRING FLUIDS

(75) Inventors: Nicolas Amouroux, Valailles (FR); Michaela Steng, Bernay (FR)

(73) Assignee: Arkema France, Colombes (FR)

( * ) Notice: Subject to any disclaimer, the term of this patent is extended or adjusted under 35 U.S.C. 154(b) by 237 days.

(21) Appl. No.: 11/413,245

(22) Filed: Apr. 28, 2006

(65) Prior Publication Data

US 2007/0059469 A1    Mar. 15, 2007

Related U.S. Application Data

(60) Provisional application No. 60/703,527, filed on Jul. 28, 2005.

(30) Foreign Application Priority Data

Apr. 29, 2005   (FR)   ................................. 05 04405

(51) Int. Cl.
- *F16L 11/04* (2006.01)
- *F16L 11/00* (2006.01)
- *F16L 9/14* (2006.01)

(52) U.S. Cl. .................. 428/36.91; 138/137; 138/141

(58) Field of Classification Search ............... 428/36.91; 138/137, 141

See application file for complete search history.

(56) References Cited

U.S. PATENT DOCUMENTS

| | | | | |
|---|---|---|---|---|
| 5,390,705 | A * | 2/1995 | Brunnhofer | 138/137 |
| 6,482,482 | B1 * | 11/2002 | Spohn | 428/35.7 |
| 6,491,994 | B1 | 12/2002 | Kito et al. | |
| 2004/0096615 | A1 * | 5/2004 | Manas-Zloczower et al. | 428/36.9 |

FOREIGN PATENT DOCUMENTS

| EP | 0 464 271 | 7/1990 |
|---|---|---|
| EP | 0 470 605 | 8/1991 |
| EP | 1 038 664 | 9/2000 |

* cited by examiner

*Primary Examiner*—Mark Ruthkosky
*Assistant Examiner*—James Yager
(74) *Attorney, Agent, or Firm*—Thomas F. Roland

(57) ABSTRACT

The present invention relates to a multilayer tube comprising, in its radial direction from the outside inwards:

an optional layer (1) made of nylon-11 or nylon-12 polyamide;

an intermediate layer (2) comprising by weight, the total being 100%:

50 to 100% of at least one polyamide A1 of formula X, Y/Z or 6, Y2/Z, in which X denotes residues of an aliphatic diamine having from 6 to 10 carbon atoms, Y denotes residues of an aliphatic dicarboxylic acid having from 10 to 14 carbon atoms, Y2 denotes residues of an aliphatic dicarboxylic acid having from 15 to 20 carbon atoms, Z denotes at least one unit chosen from residues of a lactam, residues of an $\alpha,\Omega$-aminocarboxylic acid, the unit X1, Y1, in which X1 denotes residues of a diamine and Y1 denotes residues of a diacid, the weight ratios $Z/(X+Y+Z)$ and $Z/(6+Y2+Z)$ being between 0 and 15%, and 0 to 50% of nylon-11 or nylon-12 polyamide;

an optional layer (3) made of nylon-11 or nylon-12 polyamide, with the condition that at least one of the layers (1) and (3) is present;

the layers being successive and adhering to one another, the inner layer being the layer in contact with the fluid transported.

9 Claims, No Drawings

POLYAMIDE-BASED MULTILAYER TUBE FOR TRANSFERRING FLUIDS

This application claims benefit, under U.S.C. §119(a) of French National Application Number FR 05.04405, filed Apr. 29, 2005; and also claims benefit, under U.S.C. §119(e) of U.S. provisional application 60/703,527, filed Jul. 28, 2005.

FIELD OF THE INVENTION

The present invention relates to a polyamide-based multilayer tube for transferring fluids.

As examples of tubes for fluid transfer, mention may be made of fuel tubes, and in particular those for taking fuel from the tank to the engines of motor vehicles. As other examples of fluid transfer, mention may be made of the fluids used in fuel cells, $CO_2$ systems for cooling and air conditioning, hydraulic systems, cooling circuits, air conditioning and medium-pressure power transfer, tubes immersed in tanks, and tubes for effluent treatment and vapour lines.

For safety and environmental protection reasons, motor vehicle manufacturers require these tubes to exhibit both good mechanical properties, such as pressure resistance, vibration resistance and flexibility, with good impact behaviour when cold and at high temperature (in particular in fuels containing alcohols, such as methanol and ethanol). These tubes must also have good resistance to engine lubrication oils and fuels. These tubes are manufactured by coextruding the various layers using standard techniques for thermoplastics. The invention is particularly useful for transporting fuels.

BACKGROUND OF THE INVENTION

There are many patents describing polyamide-based multilayer tubes. It is necessary to use multilayers because no polymer or polymerblend exists that has at the same time all the properties of mechanical resistance and resistance to the products transported. However, in most multilayer structures it is necessary to have adhesive layers in order to join the various polymer layers together, which polymer layers are often incompatible, thereby increasing the number of layers and complicating the manufacture.

A tube has now been found that comprises, in succession, an outer layer made of PA-11 (or PA-12), an intermediate layer made of a temperature-resistant polyamide (of the PA-6, 10 type) and an inner layer made of conductive or non-conductive PA-11 or PA-12.

The PA-11 (or PA-12) outer layer provides chemical resistance, zinc chloride resistance, impact strength and dynamic properties. The intermediate layer provides the mechanical strength and most particularly the high-temperature pressure resistance. The conductive or non-conductive PA-11 or PA-12 inner layer possibly provides conductivity, mechanical properties and chemical resistance. The layers adhere to one another without a coextrusion tie. The tube may be smooth or ringed or compromise smooth parts and ringed parts. According to other embodiments, the tube may have only two layers.

SUMMARY OF THE INVENTION

The present invention relates to a multilayer tube comprising, in its radial direction from the outside inwards:
an optional layer (1) made of nylon-11 or nylon-12 polyamide;
an intermediate layer (2) comprising by weight, the total being 100%:
50 to 100% of at least one polyamide A1 of formula X, Y/Z or 6, Y2/Z, in which X denotes residues of an aliphatic diamine having from 6 to 10 carbon atoms, Y denotes residues of an aliphatic dicarboxylic acid having from 10 to 14 carbon atoms, Y2 denotes residues of an aliphatic dicarboxylic acid having from 15 to 20 carbon atoms, Z denotes at least one unit chosen from residues of a lactam, residues of an α,Ω-aminocarboxylic acid, the unit X1, Y1, in which X1 denotes residues of a diamine and Y1 denotes residues of a diacid, the weight ratios Z/(X+Y+Z) and Z/(6+Y2+Z) being between 0 and 15%, and
0 to 50% of nylon-11 or nylon-12 polyamide;
an optional layer (3) made of nylon-11 or nylon-12 polyamide, with the condition that at least one of the layers (1) and (3) is present;
the layers being successive and adhering to one another, the inner layer being the layer in contact with the fluid transported.

If the layer (3) is present, this is the inner layer, otherwise it is the layer (2) that is the inner layer.

According to one embodiment of the invention, the inner layer contains an electrically conductive material producing a surface resistivity of preferably less than $10^6\Omega$.

According to another embodiment of the invention, the inner layer consists of two adjacent layers—one contains essentially no electrically conductive material while the other is placed on the internal side of the tube but contains in addition an electrically conductive material producing a surface resistivity of preferably less than $10^6\Omega$. These layers may consist of the same polymers, but that one placed on the inside contains in addition the electrically conductive material. Advantageously, these layers consist of the same polymers.

For example in the case in which the layer (3) is present, the inner layer (3) contains essentially no electrically conductive material and the tube includes a layer (3a) placed on the side of the layer (3), this layer being a polyamide but containing in addition an electrically conductive material producing a surface resistivity of preferably less than $10^6\Omega$. This layer (3a) becomes the inner layer.

In a specific embodiment Z is 0. In another specific embodiment the multilayer tube is made only of the layers (1) to (3), layers (1) and/or (3) being optional as explained above. In another specific embodiment the layers don't contain any fibres such as glass fibres.

These tubes may have an outside diameter of 6 to 110 mm and a wall thickness of around 0.3 to 5 mm. Advantageously, the fuel tube according to the invention has an outside diameter ranging from 4 to 32 mm and a total wall thickness of 0.8 mm to 2.5 mm.

These tubes also have good resistance to fuels and to engine lubrication oils. These tubes exhibit very good mechanical properties at low or high temperature.

The invention also relates to the use of these tubes for transporting fuel.

DETAILED DESCRIPTION OF THE INVENTION

With regard to the PA-11 or PA-12 of the layer (1), its inherent viscosity may be between 1 and 2, and advantageously between 1.2 and 1.8. The inherent viscosity is measured at 20° C. for a 0.5% concentration in meta-cresol. The polyamide of the outer layer (1) may contain 0 to 30% by weight of at least one product chosen from plasticizers and impact modifiers per 100% to 70% of polyamide, respectively.

As examples of plasticizers, mention may be made of benzene sulphonamide derivatives, such as N-butyl benzene sulphonamide (BBSA), ethyl toluene sulphonamide or N-cyclohexyl toluene sulphonamide; esters of hydroxybenzoic acids, such as 2-ethylhexyl-para-hydroxybenzoate and 2-decylhexyl-para-hydroxybenzoate; esters or ethers of tetrahydrofurfuryl alcohol, such as oligoethyleneoxytetrahydrofurfuryl alcohol; and esters of citric acid or hydroxymalonic acid, such as oligoethyleneoxy malonate. Mention may also be made of decylhexyl-para-hydroxybenzoate and ethylhexyl-para-hydroxybenzoate. One particularly preferred plasticizer is N-butyl benzene sulphonamide (BBSA).

As examples of impact modifiers, mention may be made of polyolefins, crosslinked polyolefins, EPR, EPDM, SBS and SEBS elastomers, it being possible for these elastomers to be grafted in order to facilitate their compatibilization with polyamides, copolymers containing polyamide blocks and polyether blocks. These copolymers containing polyamide blocks and polyether blocks are known per se—they are also known by the name PEBA (polyether-block-amide). Mention may also be made of acrylic elastomers, for example those of the NBR, HNBR and X-NBR type.

This polyamide may contain the usual additives, namely UV and other stabilizers, antioxidants, fire retardants, etc.

With regard to the intermediate layer, the polyamide A1 and "X", the diamine may be a straight-chain α,Ω-diamine. It may be branched or a mixture of a linear (straight chain) diamine and a branched diamine.

With regard to "Y", the diacid may be a straight-chain α,Ω-diacid. It may be branched or a mixture of a linear (straight chain) diacid and a branched diacid.

With regard to "Z", its proportion is sufficient to lower the crystallinity of the PA-X,Y and to facilitate the addition of plasticizer or impact modifier, but not so great that a copolyamide having a melting point below that of the PA-12 or PA-11 is obtained. This proportion is at most 15%, although it may vary depending on the nature of the constituents of Z. A person skilled in the art may readily verify the reduction in crystallinity by carrying out a DSC (Differential Scanning Calorimetry) measurement on the PA-X,Y and then on the PA-X,Y/Z. Advantageously, the proportion of Z is between 0 and 10%. The lactam may be chosen from caprolactam and lauryllactam. X1 is for example an aliphatic diamine and Y1 is for example an aliphatic diacid. The number of carbon atoms of X1 may be between 6 and 14. The number of carbon atoms of Y1 may be between 6 and 14.

Advantageously, the polyamide A1 is PA-6,10 (hexamethylenediamine and sebacic acid units), PA-6,12 (hexamethylenediamine and dodecanedioic acid units), PA-6,14 (having hexamethylenediamine and C14 acid units), PA-6,18 ((having hexamethylenediamine and C18 acid units).

The polyamide A1 is manufactured using the known techniques for producing polyamides and PA-11 or PA-12 may be added to it in order to regulate its modulus or its level of adhesion to the other layers.

As regards the proportions of A1 and of PA-11 or PA-12 in this intermediate layer, these are advantageously from 70 to 100% per 30 to 0% of PA-11 or PA-12, respectively.

The inherent viscosities of A1 and of the PA-11 or PA-12 of the intermediate layer are chosen, for example, within the same range as the inherent viscosities of the polyamide of the layer (1). The intermediate layer may contain plasticizers, impact modifiers and additives chosen from those described in the case of the layer (1).

With regard to the PA-11 and PA-12 of the layer (3), these have already been described above in the case of the layer (1). They may contain plasticizers, impact modifiers and additives chosen from those described in the case of the layer (1). Advantageously, the polyamide of the layer (1) is the same as that of the layer (3) and also the same as the polyamide of the intermediate layer that is added to the polyamide A1.

With regard to the inner layer containing an electrically conductive material, mention may be made, by way of example, of carbon black, carbon fibres and carbon nanotubes. Advantageously, a carbon black chosen from those having a BET specific surface area, measured according to the ASTM D 3037-89 standard, of 5 to 200 m$^2$/g and a DBP absorption, measured according to the ASTM D 2414-90 standard, of 50 to 300 ml/100 g, is used. The proportion of black by weight is advantageously from 15 to 30% per 85 to 70% of the other constituents, respectively, and preferably from 17 to 23% per 83 to 77% of the other constituents, respectively. These carbon blacks are described in patent Application WO 99/33908, the content of which is incorporated in the present application.

If the layer (3) is present, with regard to the inner layer (3a) placed on the side of the layer (3), this layer is made of a polyamide but contains in addition an electrically conductive material producing a surface resistivity of preferably less than $10^6 \Omega$. It may be of the same composition as the layer (3), except that it contains an electrically conductive material. The type of electrically conductive material and the proportions are the same as those described in the case of the layer (3) above. Advantageously, the polyamide of the layer (3a) is of the same type as that of the layer (3), that is to say if the layer (3) is made of PA-12 then the layer (3a) is made of PA-12.

The compounds for the various layers may be manufactured by standard techniques for the melt-blending of thermoplastics. The tubes of the invention may be manufactured by standard coextrusion techniques, optionally combined with moulding techniques in order to make ringed tubes.

EXAMPLES

Formulation of the PA-11: PA-11+13% BBSA+stabilizer;

Formulation of the PA-6,10 (+PA-11): PA-6,10+10% PA-11+13% BBSA+stabilizer;

Formulation of the PA-6,10: PA-6,10+13% BBSA+stabilizer;

Formulation of the PA-6,12: PA-6,12+13% BBSA+stabilizer;

Formulation of the conductive PA-11: 65% PA-11 (BESNO P40TL)+12% Pebax A+22% granular Ensaco 250 black+1% stabilizer.

The carbon black was supplied by 3M under the name "Granular Ensaco 250"—the DBP absorption was 190 ml/g and the BET surface area was about 65 m$^2$/g.

Pebax A denotes a copolymer containing PA-12 blocks and PTMG blocks, with an inherent viscosity of 1.5.

The following multilayer tubes were extruded in 6×8 geometry (outside diameter 8 mm, wall thickness 1 mm), from the outside inwards:

Tube 1 (comparative):

900 μm PA-11/100 μm conductive PA-11;

Tube 2, trilayer according to the invention:

400 μm PA-11/500 μm PA-6,10 (+PA-11)/100 μm conductive PA-11;

Tube 3, trilayer according to the invention:

250 μm PA-11/500 μm PA-6,10/250 μm PA-11;

Tube 4, bilayer according to the invention:

900 μm PA-6,10 (+PA-11)/100 μm conductive PA-11; and

Tube 5, bilayer according to the invention:

900 μm PA-6,12/100 μm conductive PA-11.

| Method | Comparative tube 1 | Tube 2 according to the invention | Tube 3 according to the invention | Tube 4 according to the invention | Tube 5 according to the invention |
|---|---|---|---|---|---|
| Instantaneous burst pressure at 130° C. (bar) | DIN 73378 | 26 | 33 | 35 | 38 | 36 |
| Tensile modulus on tube, at 23° C., 1 mm/min | ISO 527 | 350 | 450 | 500 | 560 | 670 |
| Inter-layer adhesion | SAE J2260 | OK | OK | OK | OK | OK |
| Surface resistivity (kohm.□) (kohm per square) | SAE J2260 | 10 | 10 | $10^9$ | 10 | 10 |

The invention claimed is:

1. A multilayer tube consisting, in its radial direction from the outside inwards:
   a) a layer (1) made of nylon-11 or nylon-12 polyamide,
   b) an intermediate layer (2) comprising a blend of polyamide A1 and one of nylon-11 or nylon-12 by weight, the total being 100%;
      50 to less than 100% of at least one polyamide A1 selected from the group consisting of PA-6,10, PA-6,12 and PA-6,14, and
      up to 50% of nylon-11 or nylon-12 polyamide;
   c) a layer (3) made of nylon-11 or nylon-12 polyamide, the layers being successive and adhering to one another, the inner layer being the layer in contact with the fluid transported.

2. The multilayer tube according to claim 1, wherein the innermost layer contains an electrically conductive material.

3. The multilayer tube according to claim 1, wherein the polyamide A1 is PA-6,10.

4. The multilayer tube according to claim 1, wherein the polyamide A1 is PA-6,12.

5. The multilayer tube according to claim 1, wherein the polyamide A1 is PA-6,14.

6. The multilayer tube according to claim 1, wherein the intermediate layer (2) comprises by weight, the total being 100%:
   70 to less than 100% of the at least one polyamide A1, and
   up to 30% of nylon-11 or nylon-12 polyamide.

7. The multilayer tube according to claim 1, comprising a fuel transport tube.

8. The multilayer tube of claim 1, wherein layer (1) and layer (3) are made the same polyamide.

9. The multilayer tube of claim 1, wherein the PA-11 or PA-12 of the intermediate layer (2) is the same as the polyamide of the inner and outer layers.

* * * * *